United States Patent [19]

Warren, Jr.

[11] 4,260,084
[45] Apr. 7, 1981

[54] VEHICLE LUGGAGE RACKS AND CONTAINERS CARRIED THEREBY

[75] Inventor: John A. Warren, Jr., Yorba Linda, Calif.

[73] Assignee: Dan Gurney Cycle Products, Santa Ana, Calif.

[21] Appl. No.: 884,760

[22] Filed: Mar. 9, 1978

Related U.S. Application Data

[63] Continuation-in-part of Ser. No. 708,391, Jul. 26, 1976, abandoned.

[51] Int. Cl.$^3$ .................................................. B62J 7/02
[52] U.S. Cl. .................................. 224/32 A; 224/42.11
[58] Field of Search ............... 224/29 R, 32 R, 32 A, 224/35, 36, 37, 38, 39, 41, 42.1 R, 42.1 E, 42.03 A, 42.11, 42.25, 42.42 R, 42.45 R, 42.46 R, 43, 44, 255, 273, 309, 315, 324, 329, 330, 905; 280/202, 289 A; 70/14, 57, 58, 62, 63; 248/311.1, 313, 359; 211/71; 190/18 R, 41 R, 53; 108/44; D87/5 F; D12/158; D3/71, 76

[56] References Cited

U.S. PATENT DOCUMENTS

| D. 243,943 | 4/1977 | Harris et al. ................... D12/158 |
| D. 247,326 | 2/1978 | Warren, Jr. ................... D12/158 X |
| 596,998 | 1/1898 | Hawkins et al. ................... 224/32 R |
| 1,226,101 | 5/1917 | Marsden ................... 211/71 X |
| 1,942,176 | 1/1934 | Lowe ................... 224/42.25 X |
| 2,783,927 | 3/1957 | Harley ................... 224/32 R |
| 3,110,376 | 11/1963 | Naab et al. ................... D87/5 F X |
| 3,167,284 | 1/1965 | Lynch ................... 224/32 R X |
| 3,228,575 | 1/1966 | Peterson ................... 224/42.1 E |
| 3,228,576 | 1/1966 | Gaukel ................... 224/42.03 A X |
| 3,349,978 | 10/1967 | Little et al. ................... 224/43 |
| 3,915,362 | 10/1975 | Hart ................... 224/42.1 E |
| 3,920,140 | 11/1975 | Kiser ................... 224/32 R X |
| 4,014,056 | 3/1977 | Wainwright ................... 248/311.1 X |

FOREIGN PATENT DOCUMENTS

| 875119 | 5/1941 | France ................... 224/32 R |
| 989085 | 5/1949 | France ................... 224/41 |
| 1577298 | 6/1969 | France ................... 70/58 |

*Primary Examiner*—Stanley H. Tollberg
*Attorney, Agent, or Firm*—Wills, Green & Mueth Law Corporation

[57] ABSTRACT

A piece of luggage or other container has a wall with a protruding structure which is adapted to be moved into a recess formed in a co-acting frame, with the protruding structure and frame having inter-engageable portions which extend along two sides of the protruding structure and recess and converge toward one another and have shoulders movable into an interfitting relation securing the container to the frame when the container is moved in a predetermined transverse direction generally perpendicular to the direction in which the protruding structure projects from the side wall of the container. The protruding structure is releasably retained against reverse transverse movement from the interfitting relation by appropriate holding structure, desirably taking the form of a key operated locking unit carried by the frame and engageable with the protruding structure of the container.

23 Claims, 13 Drawing Figures

VEHICLE LUGGAGE RACKS AND CONTAINERS CARRIED THEREBY

This application is a continuation-in-part of my co-pending application Ser. No. 708,391 filed July 26, 1976, now abandoned.

BACKGROUND OF THE INVENTION

This invention relates to luggage and other similar transportable containers, and to racks or frames to be utilized for supporting such containers, desirably on a motor vehicle.

When traveling in a small automobile having very limited trunk space, or when traveling on a motorcycle, bicycle, or other small vehicle, it frequently becomes necessary to attach a suitcase or other travel container to the exterior of the vehicle. For this purpose, the vehicle may have a luggage rack on which a suitcase or other container may be retained by straps, ropes, or other securing means. Difficulty is often encountered in retaining a container on such a rack tightly enough to assure against accidental loosening or detachment by the vibrational forces encountered in travel. In addition, the securing of a container in this manner may take more time than would be desired, and usually does not lock the container on the vehicle in a manner preventing theft.

U.S. Pat. No. 3,228,576 shows a container which is adapted to be mounted on the back of a small car, in a position of support on a rear bumper guard structure, and with an upper portion of the container being held against rearward movement by retaining straps. U.S. Pat. No. 2,783,927 shows a luggage carrier for cycles, having rack structures at opposite sides of the rear wheel of a motorcycle and adapted to receive and support two containers. U.S. Pat. No. 596,998 and French Pat. No. 875,119 show containers which are mounted between and interfit with two frame elements of a bicycle.

SUMMARY OF THE INVENTION

The present invention provides a specially formed suitcase or other container and associated mounting rack which are shaped to interfit in a manner attaching the container to the rack and preferably releasably locking the container against separation from the rack. More specifically, one of the walls of the suitcase or other container is given a unique configuration for interfitting engagement with a mounting portion of the rack to secure the two together.

The rack takes the form of a frame having means by which it may be attached to a vehicle, such as an automobile, motorcycle, bicycle, or the like, or any other structure for carrying the frame. The frame desirably carries locking means for positively retaining the container against detachment from the frame.

The mentioned specially formed wall of the container carries a protruding structure which projects outwardly from the wall, that is, in a direction outwardly away from the interior of the container, and which is adapted to be moved into a recess formed by the mounting frame. This recess is encircled partially or completely by memebers forming part of the frame, and is dimensioned to allow limited lateral or transverse movement of the protruding structure of the container wall relative to the frame after that structure has been moved into the recess. This lateral shifting movement is in a direction transversely of the direction in which the protruding structure projects from the container wall. Upon such transverse shifting movement of the protruding structure relative to the frame, inter-engageable portions of the frame and protruding structure move into interfitting relation in a manner blocking the protruding structure against withdrawal from the recess. These interengageable portions of the frame and protruding structure converge toward one another in the direction of such transverse shifting movement, to very effectively interlock with only slight movement of the container. In association with these interlocking parts, there are provided means for releasably retaining the protruding structure against reverse transverse movement from the interlocking retained position, and thereby locking the parts together. These means may take the form of a lock unit attached to the frame and having a part controlled by a key for movement between locking and released settings.

In the currently preferred arrangements, the frame and complementary protruding structure are both essentially triangular in shape, with the converging portions of these parts extending along first and second sides of the triangle, and with a third frame member extending along the third side and carrying the locking means for engagement with a third side of the protruding structure. In certain embodiments, the frame is formed of tubular material, which for best results and most effective retention of the luggage or other container forms a continuous unbroken structure about the defined recess within which the protruding portion of the container is received.

The locking means for retaining the container against detachment from the frame may include a projection movably carried by a side of the frame and projecting into a complementary socket carried by the container wall structure. One or more such projections may be provided, and may be actuated between active and retracted positions by a tumbler type lock mechanism.

The two converging sides of the protruding structure carried by the container form converging shoulder surfaces which are engageable with co-acting converging shoulder surfaces on the converging portions of the frame to interlock the parts against separation. The converging shoulders on the protruding portion of the container are desirably formed by giving the converging sides of the container protrusion an undercut configuration forming in them a pair of converging grooves adapted to receive or partially receive two converging members of the frame. These grooves are formed between the plane of the main side wall from which the protrusion projects and the extremity of that protrusion. The two grooves may merge together at an apex of the triangular shaped protrusion, to define together an essentially V-shaped groove engageable with the frame.

The container wall structure has means engageable with the previously discussed locking means for blocking reverse transverse movement of the protrusion within the frame. For this purpose, the protrusion may carry a socket structure engageable with a locking element carried by the frame, and desirably formed of two plates including a first plate having a depression into which the locking element is projectable, and a second plate containing an opening through which that element extends.

BRIEF DESCRIPTION OF THE DRAWINGS

Referring now to the drawings.

DESCRIPTION OF THE PREFERRED EMBODIMENTS

Figure 1:
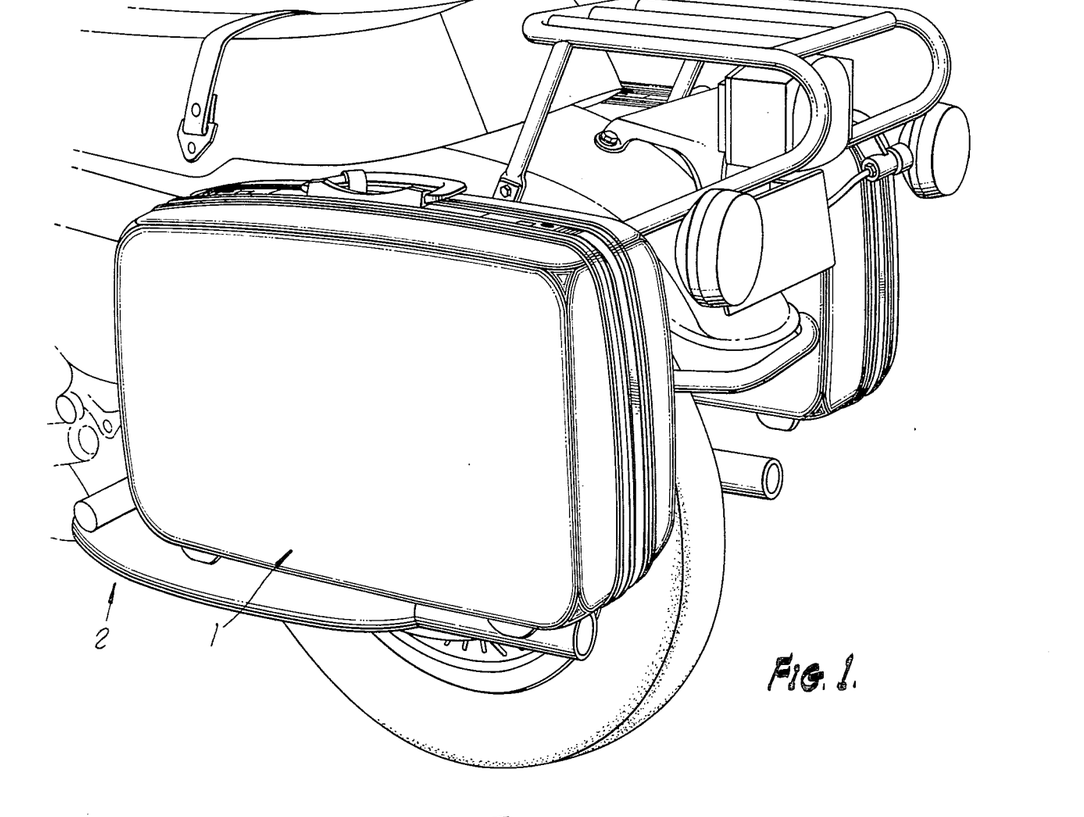
FIG. 1 shows a suitcase embodying the invention mounted on the rear of a motorcycle.
Figures 2, 3:
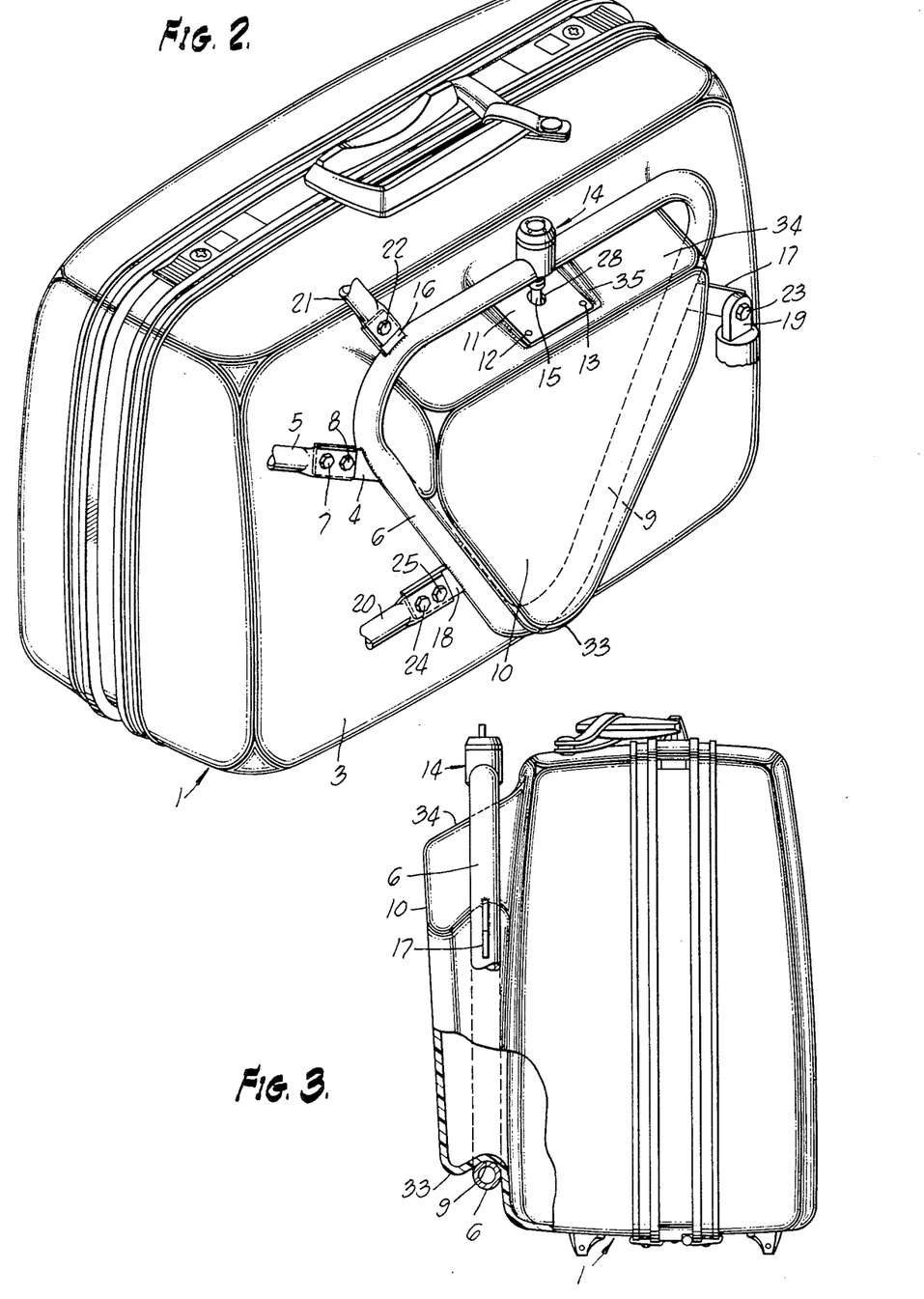
FIG. 2 is a perspective view of the suitcase of FIG. 1 and a mounting rack embodying the invention.
FIG. 3 is an end view of the suitcase and rack of FIGS. 1 and 2, with portions broken away to illustrate engagement of the rack with a groove in the container side wall structure.
Figure 4:
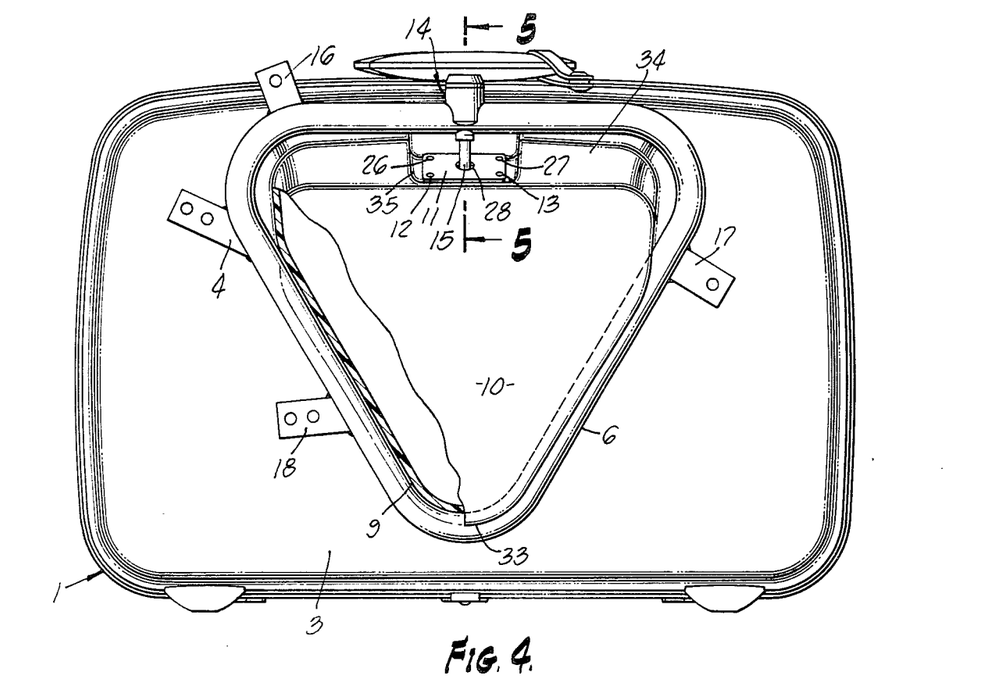
FIG. 4 is a side elevation view of the suitcase and rack, partially broken away.

Referring now in greater detail to the drawings, FIG. 1 shows a suitcase or other luggage piece 1 embodying the invention mounted on the rear of a motorcycle 2. As seen in FIGS. 2 to 4, the luggage piece has a side wall 3 forming a protrusion 10 which is generally triangular in shape. This protrusion is formed integrally with the remainder of side wall 3, and has an apex 33 pointing downwardly toward the bottom of the luggage piece.

The upper portion 34 of triangular protrusion 10 is shaped to form a generally square or rectangular well 35 integral with the rest of the side wall 3. A plate 11, made of rigid plastic, metal or other suitable material, is anchored in well 35 by a number of rivets 12, 13, 26 and 27. Plate 11 contains a central opening 28 which constitutes part of a socket structure releasably engageable in locking relation with a locking pin or projection 15.

Figure 5:
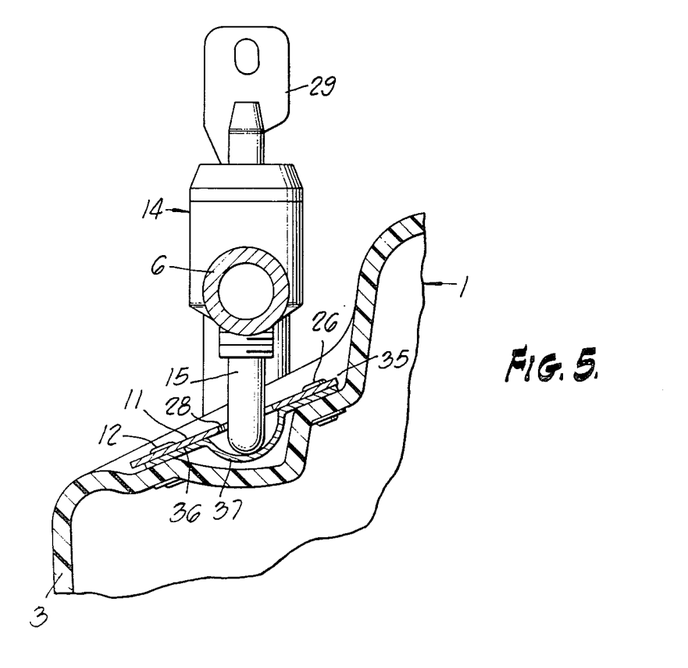
FIG. 5 is an enlarged fragmentary vertical sectional view taken on line 5—5 of FIG. 4.

As best seen in FIG. 5, a second plate 36 is anchored within well 35 below plate 11 by rivets 12, 13, 26 and 27, which pass through both of the plates 11 and 36 and through the material of side wall 3. Plate 36 is shaped to form a depression or indentation 37 which together with opening 28 in plate 11 constitutes the previously mentioned socket structure for engaging pin 15. Alternatively, plate 36 may be welded or otherwise attached to plate 11, obviating the need for the rivets to pass through plate 36.

The suitcase 11 is mounted on a motorcycle or another vehicle or other carrying structure by a rack forming a frame 6 having several mounting tabs 4, 16, 17 and 18 attachable to the carrying structure. Tabs 4, 16, 17 and 18 may be rigidly attached to struts 5, 21, 19 and 20 on the motorcycle or other carrying structure by a number of bolts 7, 8, 22, 23, 24 and 25. Frame 6 may be formed of tubing and is preferably generally triangular in shape, desirably having an apex pointing downwardly to facilitate interfitting engagement of frame 6 with groove 9 formed in two sides of protrusion 10 on the suitcase.

Figure 6:
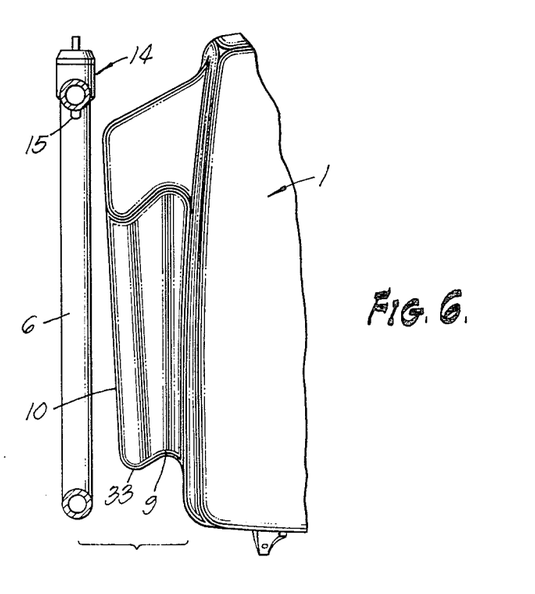
FIG. 6 is an end view of the suitcase side wall and rack disengaged from one another. A portion of the rack is cut away to illustrate its tubular cross-section.

As best seen in FIGS. 3 and 6, the suitcase or other container is mounted on the rack by passing protrusion 10 through the plane of frame 6, and then seating groove 9 on the frame, with apex 33 of protrusion 10 pointing downwardly toward the corresponding apex of frame 6, until groove 9 is seated snugly within frame 6. After groove 9 in container side wall 3 is thus seated within frame 6, a locking unit 14 is actuated, preferably by means of a key 29, to move pin 15 of that unit downwardly through a bushing or sleeve (not shown) in frame 6 and into the socket structure formed by opening 28 and indentation 37. Pin 15 protrudes into opening 28 far enough to insure that groove 9 cannot be disengaged from frame 6 because upward movement of the container side wall structure is blocked by the interaction of pin 15 with opening 28 and indentation 37.

To describe somewhat more specifically the manner in which suitcase 1 and frame 6 are constructed and interfit, the frame 6 may be considered as containing and defining a triangular recess, facing rightwardly as viewed in FIGS. 3 and 6, and into which the protrusion 10 of suitcase 11 is movable leftwardly. After such movement in that defined leftward direction, the suitcase 1 and protrusion 10 are then shiftable downwardly relative to the frame, or stated differently, in a direction transversely of the first mentioned leftward direction of initial movement, to bring the downwardly converging opposite side portions of the frame into two downwardly converging opposite side portions of groove 9 in an interfitting relation, thereby blocking rightward movement of the protrusion relative to the frame. As will be understood, the engaging surfaces of the two downwardly converging frame elements and the two downwardly converging grooves function as shoulders interfitting to prevent the discussed rightward movement of the suitcase relative to the frame.

The locking unit 14 carried by the upper horizontal portion of the triangular frame is releasably engageable with the socket structure formed at the top of protrusion 10 by the two plates 11 and 36, to prevent reverse transverse movement of the protrusion 10, upwardly relative to the frame, and thereby positively lock the protrusion in its discussed interfitting retained position in the frame. Pin 15 in its locking position preferably bears downwardly against the indentation 37 in plate 36 to in effect clamp the protrusion 10 against the downwardly converging sides of the frame. Also, the extension of locking pin 15 of unit 14 within opening 28 effectively holds the protrusion at that location against outward movement (rightwardly in FIGS. 3 and 6) relative to the frame. The locking unit 14 may be of any conventional type capable of moving pin 15 axially between its FIG. 5 locking position and an upwardly retracted position out of the depression 37 in plate 36 and far enough above opening 28 in plate 11 to permit removal of the suitcase. The lock unit may be of the usual tumbler type, and may act to shift pin 15 upwardly and downwardly in FIG. 5 in response to rotation of the key. Alternatively, the lock may be of a type completely removable from the frame, and adapted to be inserted downwardly through an opening in the frame and to its FIG. 5 position, and then be locked against upward removal from that position by turning of key 29. Any other type of locking mechanism which can releasably lock an element such as pin 15 in a locking position may be employed.

When it is desired to remove the suitcase from the mounting frame, the lock mechanism is actuated to permit upward movement of pin 15 from the co-acting socket structure on the container, following which the protrusion on the container can be shifted upwardly and withdrawn rightwardly as viewed in FIGS. 3 and 6 out of the recess or opening formed by the frame. It is believed desirable in most instances that the angle of convergence of the two downwardly converging opposite side portions of frame 6, and the angle of convergence of the corresponding grooved sides of protrusion 10, be approximately 60 degrees, in which case the triangles formed by the frame and protrusion are approximately equilateral triangles.

Figure 7:
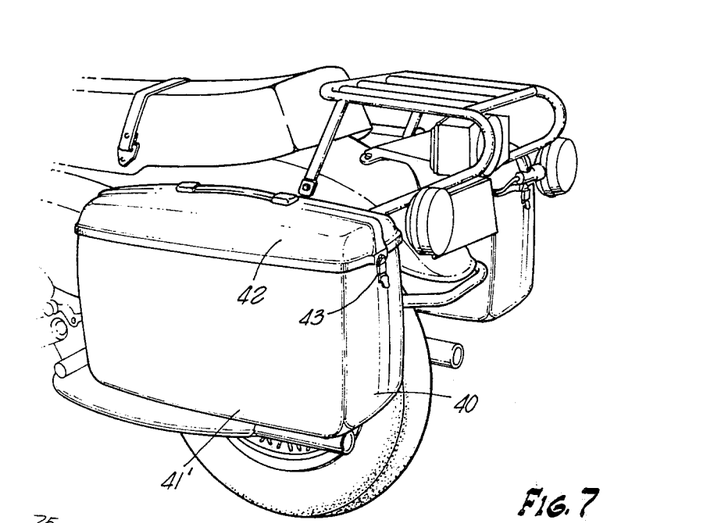
FIG. 7 is a perspective view showing a top-loading type of 'saddle bag' container mounted on a motorcycle.
Figures 8, 9:
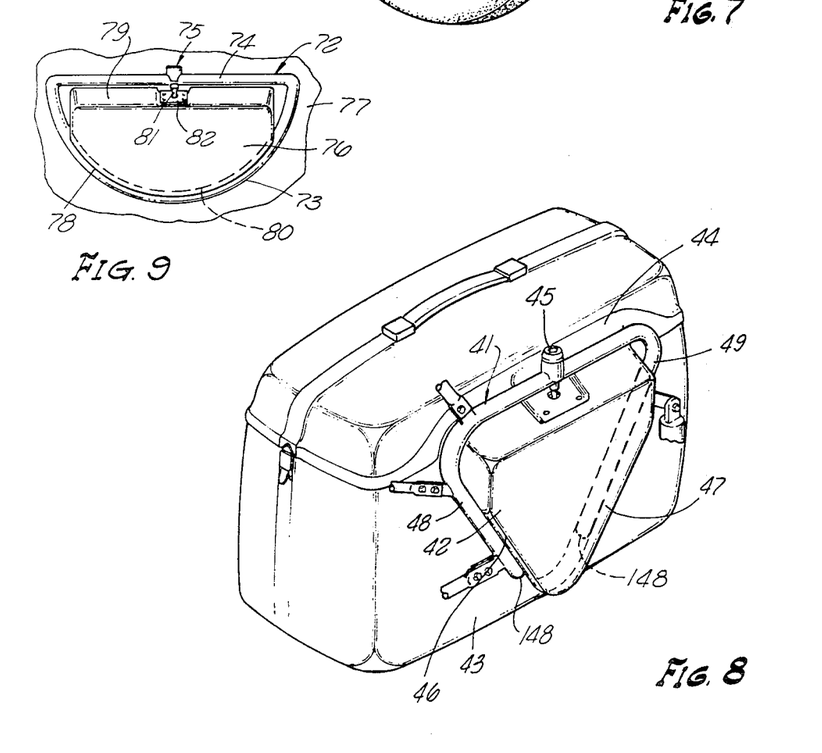
FIG. 8 shows the back side and a variational type of mounting frame for the container of FIG. 7.
FIG. 9 is a fragmentary side view similar to FIG. 4 of another variational arrangement utilizing a semicircular frame.

FIGS. 7 and 8 show a variational form of the invention, in which the container 40 mounted by frame 41 is typically illustrated as a top opening container, rather than the side opening suitcase structure of FIGS. 1 to 6. More specifically, the container 40 has a main lower portion 41' and a removable cover 42 which when opened provides access to the storage space within the interior of the container. A latch assembly 43 may retain the cover in closed condition. The frame 41 of FIGS. 7 and 8 is the same as frame 6 of the first form of the invention, except that frame 41 is interrupted at its lower end rather than being continuous entirely about the coacting essentially triangular protrusion 42 formed by and projecting from a side wall 43 of the lower portion 41' of the saddle bag. More specifically, the two converging side portions 48 and 49 of the frame may terminate at the locations 148, or alternatively the frame may be interrupted at any other location so long as it has converging portions capable of engaging and retaining the protrusion in the manner discussed.

As seen in FIG. 8, the top edge 44 of the main portion 41' of container 40 may be offset upwardly at the location of protrusion 42. A key actuated lock unit 45 may be carried by the top portion of the triangular frame 41, for releasably locking the protrusion in a retained condition in which downwardly converging grooves 46 and 47 formed in opposite sides of the protrusion receive the downwardly converging opposite side portions 48 and 49 of the frame in the previously discussed interfitting condition coacting with the lock unit 45 to retain the container against separation from the frame.

While both of the forms of the invention thus far described include frames and interfitting protrusions which are essentially triangular in shape, and in which the converging interlocking portions or shoulders of the frames and protrusions extend along essentially straight lines as they converge, it is contemplated that the frame and protrusion may, if desired, assume a shape other than triangular, and may have converging portions which are curved rather than of straight line configuration. One such variational arrangement is illustrated in FIG. 9, in which the frame 72 has an essentially semi-circularly curving portion 73 whose opposite ends are joined by a straight horizontal upper cross piece 74 carrying the key actuated locking unit 75. The protrusion 76 formed on side wall 77 of a suitcase or other container has a semi-circularly curving edge 78 joined by an upper generally straight line surface 79 and containing an arcuate essentially semi-circular groove 80 serving the purpose of groove 9 in the first form of the invention and engageable with the curving portion 73 of the frame in interlocking relation. The semi-circular portion 73 of the frame, as it extends downwardly from opposite ends of portion 74, thus forms two downwardly converging portions of the frame adapted to be received partially within corresponding downwardly converging portions of groove 80 to interlock protrusion 76 with the frame and against removal therefrom when the protrusion is inserted into and then moved downwardly within the semi-circular recess formed by the frame. As in the other forms of the invention, actuation of key operated locking unit 75 moves pin 81 downwardly into interfitting relation with a socket structure 82 corresponding to that formed by plates 11 and 36 of the first form of the invention, to releasably retain the protrusion against upward movement relative to the frame and thus hold the container on the frame.

Figure 10:
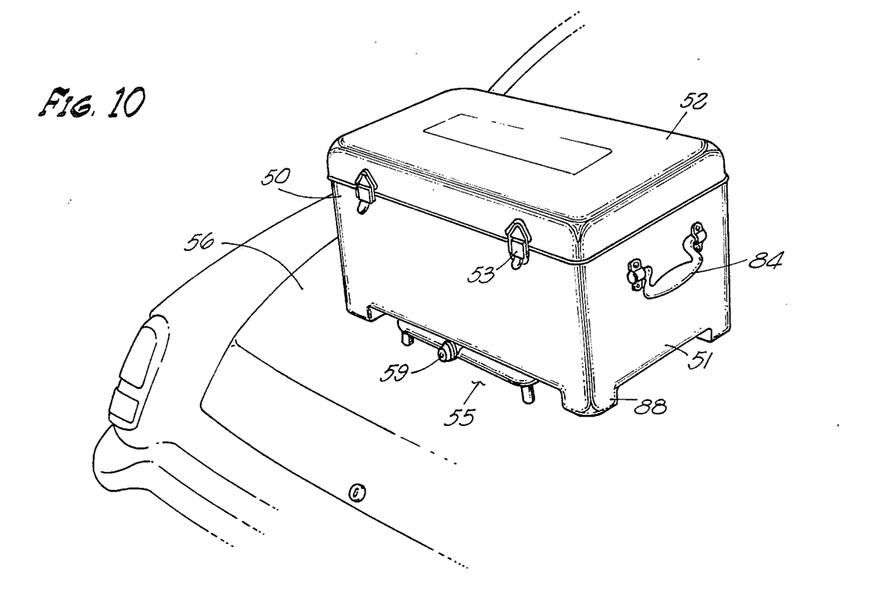
FIG. 10 is a perspective view of another form of the invention, including an upwardly facing frame and carried ice chest.
Figure 11:
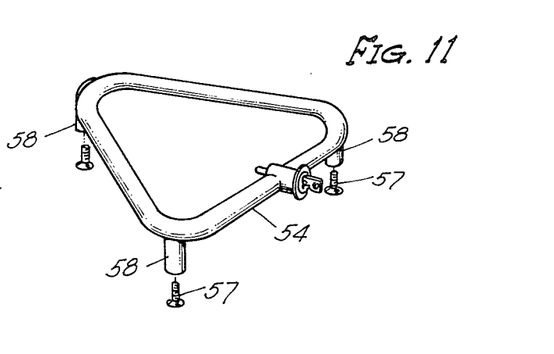
FIG. 11 illustrates the frame of FIG. 10 separately.
Figure 12:
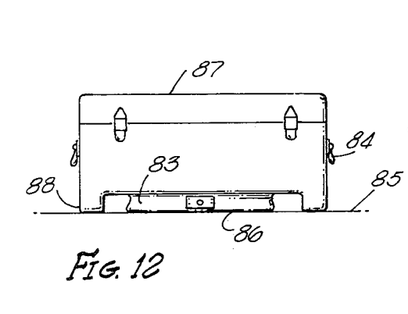
FIG. 12 shows the ice chest of FIGS. 10 and 11 removed from its mounting frame and positioned on a table or other support surface.

FIGS. 10 to 12 show another variational arrangement in which the container 50 is an ice chest, having a main lower portion 51 and a top cover 52 hinged to the lower portion and retained in closed condition by latches 53. The frame 54 in this case is mounted to a generally horizontally extending upwardly facing surface 55 on a vehicle, typically on the top of a trunk lid 56, and may be secured thereto in any appropriate manner, as by screws 57 extending upwardly through the trunk lid and connecting into three legs 58 projecting downwardly at the underside of the frame. The frame 54 preferably has the essentially triangular configuration shown in FIGS. 1 to 6, though it may of course be shaped otherwise as for instance in FIG. 9. The frame coacts with a similarly shaped protrusion 83 such as that shown at 10, 42 or 76 in the first three forms of the invention, and interfits with the frame in the same relation discussed hereinabove. A preferably key actuated lock unit 59 carried by a rear portion of the triangular frame urges the grooved sides of the protrusion against the other two sides of the frame to lock the ice chest on the upwardly facing frame. The orientation of the arrangement of FIGS. 10 to 12 on the automobile may be such that the ice chest may be slid onto the frame from the back while grasping handles 84 at opposite sides of the chest.

The underside of ice chest 50 of FIGS. 10 to 12 is desirably so shaped that the ice chest, when removed from its position of connection to frame 54, can be placed on and will rest in level condition on a horizontal support surface such as that represented at 85 in FIG. 12. For this purpose, the undersurface 86 of mounting protrusion 83 on the ice chest may be essentially flat and lie in a plane parallel to the top horizontal surface 87 of the chest, so that contact of surface 86 with surface 85 will support the chest in level condition. For the same purpose, the bottom of the ice chest may have downwardly projecting legs 88 at its corners, or extending along opposite sides thereof, with these legs also serving to contact support surface 85 and support the chest thereon in level condition. It is contemplated that the protrusion and legs may have co-planar undersurfaces for simultaneously contacting surface 85, as shown, or alternatively either the protrusion or the legs may be employed separately for this purpose. That is, if the protrusion is to serve alone for supporting the chest on surface 85, the legs may be omitted; and if the legs are to be employed alone they may project downwardly a short distance beyond the undersurface of the protrusion.

Figure 13:
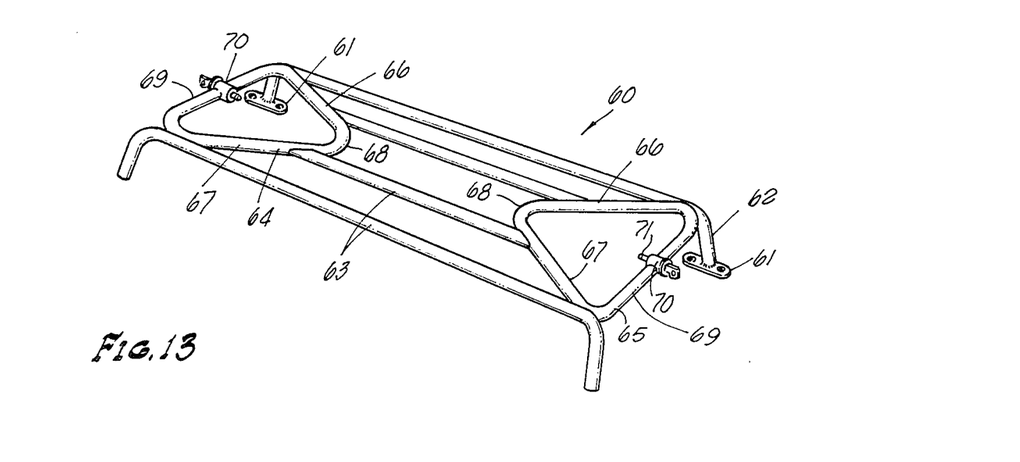
FIG. 13 shows another form of the invention to be used for mounting two suitcases or containers in side by side relation.

FIG. 13 shows another luggage rack 60 embodying the invention, which rack may be mounted to an upwardly facing surface such as the trunk lid 56 of FIG. 10, and which is typically secured to that surface by screws or other fasteners extending through flanges 61 carried by two or more of the legs 62 of the frame. This frame 60 may have a number of parallel frame elements 63, welded or otherwise rigidly secured to and carrying a pair of triangles 64 and 65 formed of tubing and having the same shape as the triangular frame 6 of FIGS. 1 to 6. Two converging sides 66 and 67 of each of the triangles may form an apex 68 pointing toward the other triangle, with a third and outer side 69 of each triangle carrying at a central location a locking unit 70 corresponding to the lock unit 14 of the first form of the invention. This lock unit actuates a pin 71 axially toward and away from the inner apex 68 of the corresponding triangle, to lock within the triangle a protrusion shaped the same as protrusion 10 of the first form of the invention. A suitcase, ice chest, or other container may thus be connected to each of the two triangles of the FIG. 13 rack, to positively and effectively secure two such containers to the vehicle in side by side relation. Each of these containers may be slid onto the frame from a side thereof, and removed from the frame by movement toward that side, in a manner avoiding interference with the other container carried by the other triangle.

I claim:

1. The combination comprising:

a container for holding articles to be transported and which is openable to provide access to a space in the container;

said container having a wall adjacent said space which carries a protruding structure projecting outwardly from the wall in a predetermined direction and away from said space;

a frame adapted to be mounted on a vehicle and to which said container is removably connectable said frame forming a recess dimensioned to permit movement of said protruding structure of the container into said recess in said direction in which the protruding structure projects and to permit movement of said protruding structure out of said recess in the opposite direction, and to permit movement of said protruding structure while in said recess in a direction transversely of said direction in which the protruding structure projects, and to a retained position;

said protruding structure and said frame having inter-engageable portions which extend along two sides of said protruding structure and recess and converge toward one another as they advance in said transverse direction and which form shoulders interfitting in said retained position of the protruding structure in a relation blocking movement of the protruding structure out of said recess in said direction which is the opposite of said direction of projection of the protruding structure; and a releasable retaining unit carried by said frame at a third side of said protruding structure and recess and receivable in the path of and blocking movement of said protruding structure relative to said frame in a direction the reverse of said transverse direction from said retained position and thereby releasably holding said container against removal from the frame.

2. The combination as recited in claim 1, in which said retaining unit is carried by said frame and having a portion movable into and out of a position in the path of reverse transverse movement of said protruding structure from said retained position.

3. The combination as recited in claim 1, in which said locking unit is a key actuated lock unit for releasably blocking reverse transverse movement of said protruding structure.

4. The combination as recited in claim 1, in which said frame and said protruding structure are generally triangular.

5. The combination as recited in claim 4, in which the frame is in the form of an equilateral triangle.

6. The combination recited in claim 1, in which said converging portions of the protruding structure and the frame are of arcuate configuration.

7. The combination as recited in claim 1, in which said retaining unit includes a lock unit carried by said frame and having a retractable pin projecting generally transversely of said direction in which the protruding structure projects, a first plate carried by said protruding structure and having an indentation within which said pin is receivable, and a second plate carried by said protruding structure and containing an opening spaced from said indentation and through which said pin projects.

8. The combination as recited in claim 1, in which said wall is larger than said protruding structure and has portions laterally beyond the periphery thereof.

9. The combination as recited in claim 1, in which said inter-engageable portions of the protruding structure and frame include two converging opposite side members of said frame and two converging grooves formed in opposite sides of said protruding structure for receiving said frame members, said frame members and grooves having surfaces forming said interfitting shoulders.

10. The combination as recited in claim 1, in which said frame and said protruding structure are generally triangular, said inter-engageable portions of the protruding structure and frame including two converging frame members forming first and second sides of the triangular frame, and two converging grooves in first and second sides of the triangular protruding structure and adapted to receive said frame members in interfitting relation, said triangular frame having a third member extending along said third side thereof, said retaining unit being a lock unit carried by said third frame member intermediate opposite ends thereof and having a pin retractably projecting essentially transversely of said direction in which the protruding structure projects and toward said protruding structure, and a socket structure carried by said protruding structure and into which said pin is projectable in a relation blocking said reverse transverse movement of the protruding structure relative to the frame.

11. The combination as recited in claim 10, in which said socket structure includes a first plate carried by said protruding structure and containing an indentation into which said pin is projectable, and a second plate overlying the first plate and secured to said protruding structure and containing an opening spaced from said indentation and through which the pin extends.

12. The combination as recited in claim 1, in which said frame forms two triangles having apexes pointing toward one another and defining two of said recesses within which said protruding structure is retainable.

13. For use with a container having walls extending about a space within the container and one of which walls has a protruding structure; the combination comprising:

a frame for mounting said container and adapted to be carried by a vehicle and containing a recess facing in a predetermined first direction and into which said protruding structure is movable in the opposite direction;

said frame having portions which extend along two sides of the recess and which converge toward one another and which form shoulders acting upon movement of the protruding structure in a direction transversely of said direction in which the recess faces to interfit with shoulders on the protruding structure in a relation blocking movement of the protruding structure out of said recess in said direction in which the recess faces; and     a releasable retaining unit carried by said frame at a third side of said recess and receivable in the path of and blocking movement of said protruding structure relative to said frame in a direction the reverse of said transverse direction and thereby releasably holding said container against removal from the frame.

14. The combination as recited in claim 13, in which said retaining unit includes a key actuated lock unit for releasably retaining said protruding structure against said reverse transverse movement relative to the frame.

15. The combination as recited in claim 13, in which said frame is generally triangular.

16. The combination as recited in claim 15, in which the frame is in the form of an equilateral triangle.

17. The combination as recited in claim 13, in which said recess formed by the frame is generally triangular with said converging portions of the frame consisting of members extending along and defining two sides of the triangle, and with a third member of the frame extending along and defining the third side of the triangle, said retaining unit being carried by said third member of the frame.

18. The combination as recited in claim 13, in which said recess formed by the frame is generally triangular, with said converging portions of the frame consisting of members extending along and defining two sides of the triangle, and with a third member of the frame extending along and defining the third side of the triangle, said retaining unit including a key actuated lock unit carried by said third member of the frame and having a key-controlled portion movable into and out of a position for blocking said reverse transverse movement of the protruding structure.

19. The combination as recited in claim 13, in which the portions of the frame which converge toward one another are of arcuate configuration.

20. The combination as recited in claim 13, in which said frame forms two triangles having apexes pointing essentially toward one another and defining two of said recesses for receiving said protruding structure, there being two of said releasable retaining units associated with said two triangles respectively.

21. The combination as recited in claim 13, including a vehicle, and means attaching said frame to said vehicle.

22. The combination recited in claim 1 wherein said protruding structure is formed on the bottom of said container and has an undersurface engageable with a supporting surface in a relation supporting the container thereon.

23. The combination recited in claim 1 wherein said protruding structure is formed on the bottom of said container, said container having legs projecting downwardly at its undersides for engagement with a supporting surface in a relation supporting the container thereon.

* * * * *